(12) United States Patent
Medicke et al.

(10) Patent No.: US 7,512,631 B2
(45) Date of Patent: Mar. 31, 2009

(54) METHOD FOR IDENTIFYING DATABASE TRIGGERS

(75) Inventors: John A. Medicke, Raleigh, NC (US); Feng-wei Chen Russell, Cary, NC (US); Michael William Smith, Raleigh, NC (US); Ray Zhong Tan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 11/387,221

(22) Filed: Mar. 23, 2006

(65) Prior Publication Data

US 2007/0226171 A1    Sep. 27, 2007

(51) Int. Cl.
*G06F 17/30* (2006.01)
(52) U.S. Cl. ............... 707/103 R; 707/102; 707/203
(58) Field of Classification Search ............ 707/100, 707/103 R, 103 X, 103 Y, 103 Z, 102, 203; 709/224
See application file for complete search history.

(56) References Cited

U.S. PATENT DOCUMENTS 5,701,400 A    12/1997  Amado
6,405,212 B1 *  6/2002  Samu et al. ............ 707/103 R
6,763,379 B1 *  7/2004  Shuster ..................... 709/224
2005/0010595 A1  1/2005  Brown et al.

OTHER PUBLICATIONS

Hilbert et al., "Extracting Usability Information from User Interface Events", ACM Computing Surveys, vol. 32, No. 4, Dec. 2000, pp. 384-421.
Harrison, "Active Rules in Deductive Databases", ACM 1993, pp. 174183.
Robinson et al., "Requirements Interaction Management", ACM Computing Surveys, vol. 35, No. 2, Jun. 2003, pp. 132-190.

\* cited by examiner

*Primary Examiner*—Cam-Linh Nguyen
(74) *Attorney, Agent, or Firm*—Duke W. Yee; Bruce Clay; Brandon G. Williams

(57) ABSTRACT

A method to identify database triggers in a data processing system. A request is received to create a database monitor for a specific application event and in response to receiving the request to create the database monitor, the database monitor is created. Then, a request is received to monitor the specific application event within a database and in response to receiving the request to monitor the specific application event, a replicate database of the database is created. Subsequently, the database is compared to the replicate database after the specific application event occurs to identify changes in the database associated with the specific application event. A best candidate is identified for a database trigger based upon the identified changes in the database associated with the specific application event.

10 Claims, 7 Drawing Sheets

FIG 6A

| EVENT | SQL | TableName | EXEC ORDER | COLUMN NAME | VALUE CHANGE | RECOMMENDED TRIGGER TARGET | RECOMMENDED TRIGGER PRIORITY |
|---|---|---|---|---|---|---|---|
| MAKE PENDING CLEAR | UPDATE | TBLAUCTIONHEADER | 1 | AUCTIONSTATUS | 7 | YES | 1 |

| EVENT | SQL | TableName | EXEC ORDER | COLUMN NAME | VALUE CHANGE | RECOMMENDED TRIGGER TARGET | RECOMMENDED TRIGGER PRIORITY |
|---|---|---|---|---|---|---|---|
| ASSIGN BIDDER | INSERT 620 | TBLAUCTSUPPLIERS | 1 | AUCTIONSTATUS | 3 | YES | 1 |
| ASSIGN BIDDER | UPDATE 622 | TBLAUCSUPPLIERS | 2 | AUCTIONSTATUS | 6 | NO | 2 |

618 — 624

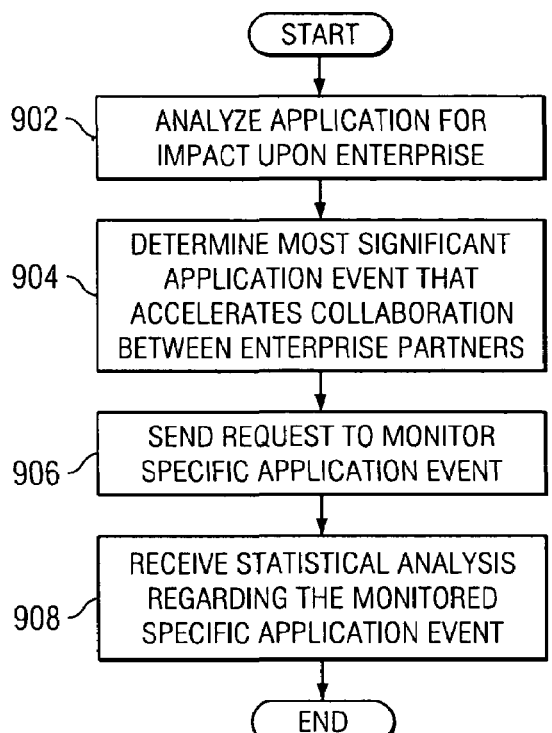

1000 db2 create event monitor MonitorName for statements write to table STMT(table schema.tableName, includes(start_time, stop_time, stmt_text)) manualstart Example:
db2 create event monitor INSERT for statements write to table STMT(table CUSTOMER.INSERT, includes(start_time, stop_time, stmt_text)) manualstart.

db2 set event monitor INSERT state=1 to turn on monitor.

db2 set event monitor INSERT state=0 to turn off monitor.

METHOD FOR IDENTIFYING DATABASE TRIGGERS

BACKGROUND OF THE INVENTION

1. Field of the Invention

The present invention relates generally to an improved data processing system. More specifically, the present invention is directed to a computer implemented method, apparatus, and computer useable program code to identify database triggers.

2. Description of the Related Art

In today's dynamic data processing environment, an enterprise may encounter frustration because software application enhancement needed accommodate process changes within the enterprise is difficult to accomplish without totally redesigning the entire system. Often system integrators and software vendors design systems based upon current enterprise processes. Consequently, the systems tend to be rigid. This is particularly true for database application systems where the original design of the database schema dictates what actions the application can perform. This type of database schema design leaves little room for future enhancement or adjustment.

Traditionally, two approaches are used to address the problem of application enhancement stated above. One approach is provided by the software application itself. Using this approach, the software application has the ability to send messages, with regard to specific application actions, to other systems for analysis according to the original design of the software application. For example, WebSphere® Commerce Suite has the ability to send a message with regard to detailed purchase order information. This message may then be sent to an enterprise resource planning system or a customer relationship management system for analysis and possible further action. This type of software application tends to provide only limited application enhancement ability for certain application actions and cannot cover all possible end user scenarios that might occur in real life.

Developers of the software application provide the second approach. Using this second approach, developers create triggers within the software application according to the enterprise's needs. Triggers are procedures, which are stored in a database, and are executed or "fired" when a table is modified. Triggers are powerful tools that may be used to perform many tasks such as restricting access to specific data, perform logging, or auditing of data sets. A trigger is activated whenever a specified event, such as an insert event, delete event, or update event, occurs on a particular table. Also, triggers have an activation time, such as before, after, or instead of the triggering event.

Using this second approach, developers are required to allocate large amounts of time to understand the relationship between application actions and the data persistency within the associated database or databases. This second approach usually is very time consuming and relies heavily on the developer's database skills and understanding of database table relationships. Consequently, using this approach, if a developer does not posses the required database expertise to design and develop enterprise logics based on triggers that are previously not available or otherwise costly to discover, application enhancement is hampered.

As a result, enterprises with changing process needs are forced to go back to the system integrator or software vendor to request redesign of the database schema to add more triggering capabilities or hire database experts to thoroughly analyze the database schema to discover triggers. Both of these options create large expenditures for the enterprise and cause decreased enterprise productivity due to delayed system modifications.

Therefore, it would be beneficial to have a computer implemented method, apparatus, and computer usable program code to automatically discover and identify database triggers for any software application action without understanding the underlying database schemas for system application enhancement.

BRIEF SUMMARY OF THE INVENTION

The present invention provides a computer implemented method to identify database triggers in a data processing system. A request is received to create a database monitor for a specific application event. As a result, the database monitor is created in response to receiving the request. After the database monitor is created, a request is received to monitor the specific application event within a database. In response to receiving the request to monitor the specific application event, a replicate database of the database is created. Subsequently, the database is compared to the replicate database after the specific application event occurs to identify changes in the database associated with the specific application event. Thereafter, a best candidate is identified for a database trigger based upon the identified changes in the database associated with the specific application event.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A & 6B are exemplary tables stored in a trigger information repository in accordance with an embodiment of the present invention;

FIG. 9 is a flowchart illustrating an exemplary process for a client to request database monitoring in accordance with an embodiment of the present invention; and FIG. 10 is an exemplary algorithm for monitoring the specific application event in accordance with an embodiment of the present invention.

DETAILED DESCRIPTION OF THE INVENTION

Figure 1:
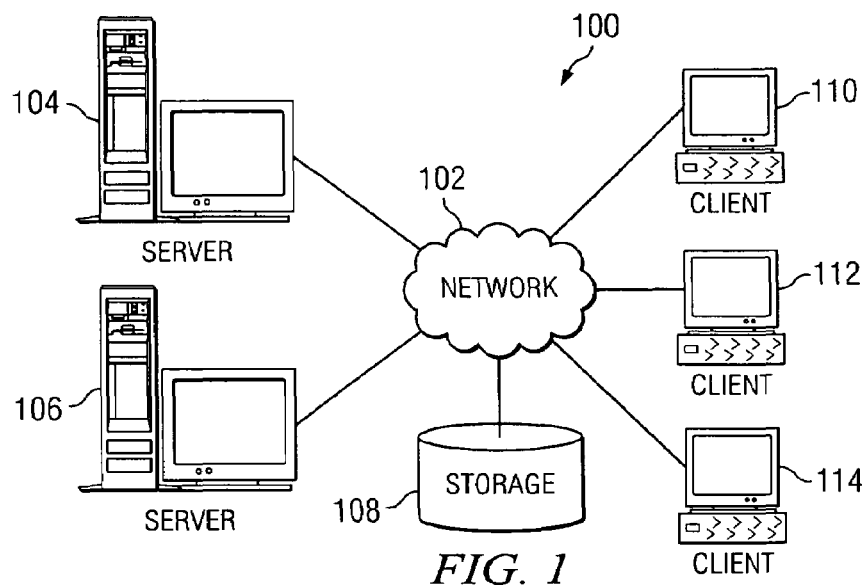
FIG. 1 is a pictorial representation of a network of data processing systems in which aspects of the present invention may be implemented.
Figure 2:
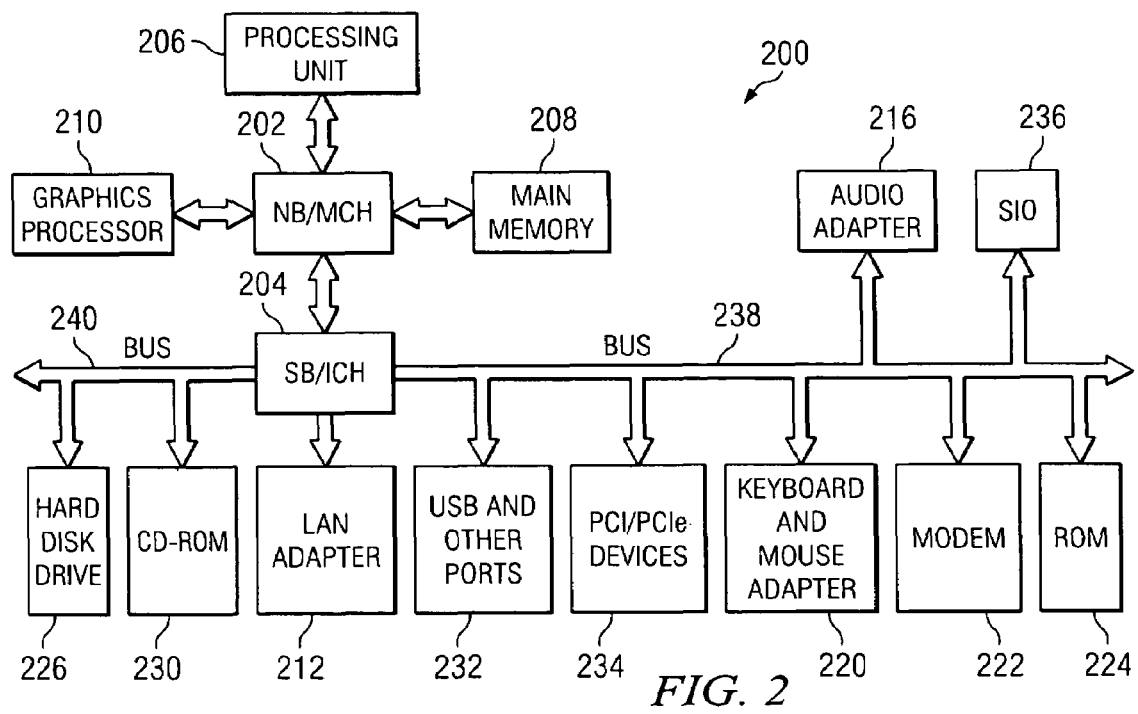
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a computer implemented method, apparatus, and computer usable program code for automatic discovery and identification of database triggers for any software application action without understanding the underlying database schemas. A server receives a request from an application developer using a client device to create a database monitor for a specific application event. As a result, the server creates the database monitor in response to receiving the request. After creating the database monitor, the server receives a request to monitor the specific application event within a database. In response to receiving the request to monitor the specific application event, the server creates a replicate database of the database.

Then, the database monitor monitors the specific application event. Subsequently, a database comparator compares the database and replicate database to identify each table, column, and value affected by the specific application event. A trigger information repository records the identified changes in the database associated with the specific application event.

Thereafter, a database analyzer identifies candidates for a database trigger based upon the identified changes in the database associated with the specific application event. The database analyzer lists the identified database trigger candidates in a table in decreasing priority order. In addition, the database analyzer creates a user defined function stub associated with the identified database trigger candidates and performs a statistical analysis of the information contained in the trigger information repository. Finally, the server sends the identified database trigger candidate list and created user defined function stubs, along with the statistical analysis, to the application developer using the client device.

Using aspects of the present invention, an enterprise may quickly create any database trigger the enterprise desires for system enhancement after reviewing the analysis of the monitored application event. Further, using aspects of the present invention may eliminate the need to depend on an independent software vendor for database subject matter expertise to explain how the enterprise's application is related to the enterprise's underlying database schema. Also, using aspects of the present invention may relieve the enterprise's application developers from the task of understanding complex database schemas and decoding values used to represent the status of monitored applications.

Thus, embodiments of the present invention use an application-centric approach to discover and identify database triggers as opposed to a database-centric approach. In other words, embodiments of the present invention relieve the application developers from spending significant amounts of time understanding underlying complex database schemas. Consequently, enterprises using aspects of the present invention may more easily enhance any system application, which depends upon monitoring of certain data values.

Furthermore, using aspects of the present invention enterprises may decrease the time necessary to detect emerging system requirements and solve the need prior to decreased system productivity. For example, aspects of the present invention may detect enterprise inventory problems before customers are effected, identify sales opportunities sooner to increase product sales, and discover decreased employee productivity to assist in employee training or remediation. Moreover, using aspects of the present invention may facilitate data or message exchange across applications and systems to increase interoperability.

Figure 3:
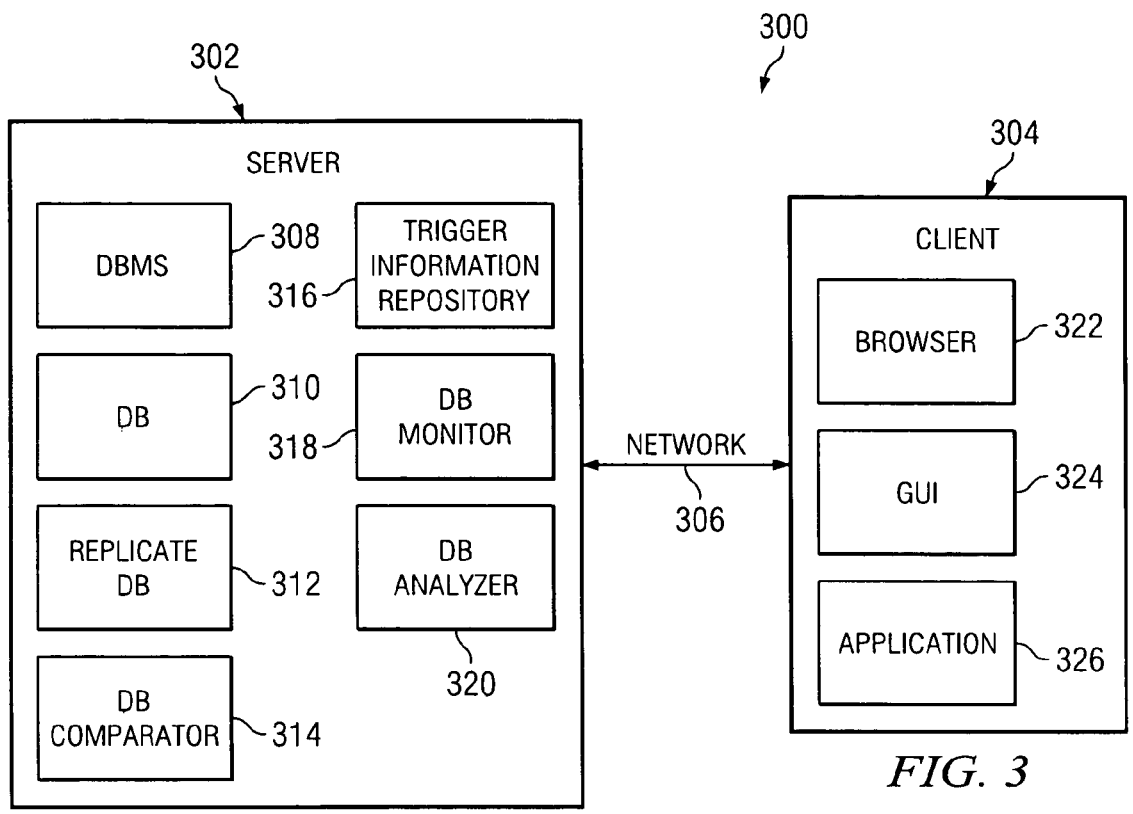
FIG. 3 is a block diagram illustrating components of a server and a client used for automatic discovery and identification of database triggers in accordance with an embodiment of the present invention.

Turning now to FIG. 3, a block diagram illustrating components of a server and a client used for automatic discovery and identification of database triggers is shown in accordance with an embodiment of the present invention. Distributed data processing system 300 includes server 302 and client 304, which are coupled together by network 306. For example, network data processing system 100 contains server 104 and client 110 that are connected together by network 102 in FIG. 1.

Server 302 may include database management system (DBMS) 308, database (DB) 310, replicate database 312, database comparator 314, trigger information repository 316, database monitor 318, and database analyzer 320. Data base management system 308 is a software application that provides controls for the organization, storage, retrieval, security and integrity of data in a database, such as database 310 and replicate database 312. Although database 310 and replicate database 312 are depicted within server 302, database 310 and replicate database 312 may reside in another server, such as server 106 in FIG. 1, or within a storage unit, such as storage 108 in FIG. 1, or any combination thereof. In addition, even though database 310 is illustrated as a single database, database 310 may include a plurality of databases. Database 310 is a set of related files that may include any type of data relevant to the operation of an enterprise utilizing database 310.

Replicate database 312 is an identical replication or reproduction of database 310 at a set point in time. The set point in time is a time prior to the start of monitoring of a specific application event. Although replicate database 312 is shown within the same server as database 310, replicate database 312 may reside in a storage unit or different server as database 310. Replicate database 312 is used to identify changes in database 310 by comparing replicate database 312 to database 310 after the set point in time when replicate database 312 was created. Database comparator 314 invokes an intelligent algorithm to compare replicate database 312 to database 310 to determine the exact changes that occurred in database 310 after a specific application event occurred during normal operation of database 310. Database comparator 314 identifies each table, column, and value that changed as a result of the specific application event.

Trigger information repository 316 records and stores the identified changes in database 310. Database monitor 318 invokes an intelligent algorithm to monitor any specified application event by capturing the name of the specific application event to be monitored, the structured query language (SQL) statement for the specific application event, and the structured query language statement start and end time. This information obtained by database monitor 318 is recorded in trigger information repository 316. Database analyzer 320 invokes an intelligent algorithm to analyze the contents of trigger information repository 316. Database analyzer 320 creates statistical analysis of the monitored application event. In addition, database analyzer 320 provides recommendations for database triggers for the specific application event and lists the recommendation in decreasing priority order from the most relevant to the least relevant database trigger candidate. Further, database analyzer 320 creates a user defined function (UDF) stub for the recommended database triggers.

Client 304 may include browser 322, graphical user interface (GUI) 324, and application 326. Browser 322 is utilized for connecting client 304 with server 302 over network 306. Graphical user interface 324 is used to provide a means for an end user, such as an application developer, to interact, for example, with application 326 and server 302.

Application 326 is a software application designed to request information from database 310 or to manipulate data by inserting, deleting, or updating data within database 310. In other words, database 310 is an associated database with application 326 in distributed data processing system 300. Application 326 may be any type of software application utilized by an enterprise employing embodiments of the present invention.

An application developer collects information with regard to application 326 and the related database, such as database 310, which supports application 326. Also, client 304 may provide the application developer with statistical analysis of the impact of application 326 upon the enterprise. Moreover, client 304 may identify which specific application event significantly accelerates collaboration between the enterprise and partners of the enterprise.

After reviewing the collected information with regard to application 326, the application developer, using client 304, sends a request to server 302 to set-up database monitor 318 for monitoring a specific application event of application 326. Database management system 308 uses an algorithm to create database monitor 318. An example of an algorithm is shown in FIG. 10 and will be discussed further below.

Subsequent to sending the request to set-up database monitor 318, the application developer sends a request for monitoring of the specific application event, such as, for example, insertion of a new customer name within a table in database 310. Of course it should be noted that insertion of a new customer name as the specific application event to be monitored is only used for illustration purposes and that any application event may be monitored by embodiments of the present invention. However, for illustration purposes, the specific application event referred to in this specification is an insert, delete, or update structured query language statement.

Figure 4:
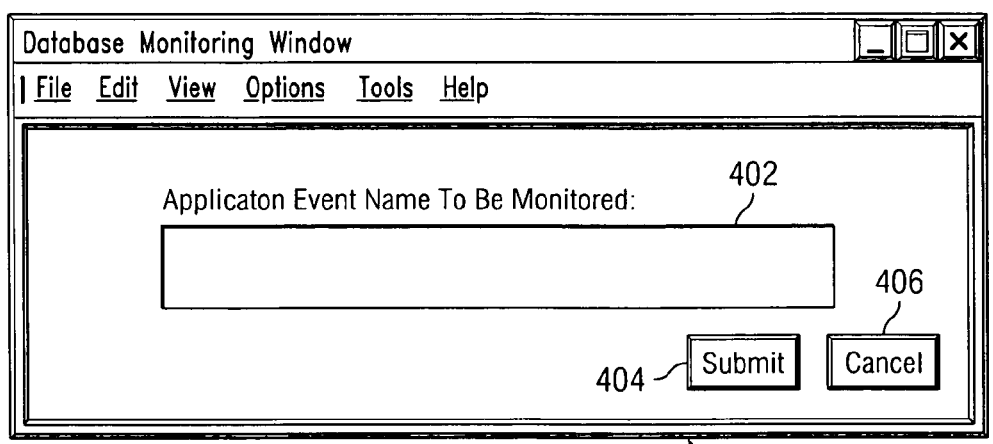
FIG. 4 is a diagram illustrating an exemplary window for identifying the specific application event to be monitored in accordance with an embodiment of the present invention.

In response to receiving the request for monitoring of the specific application event, database monitor 318 sends an application event-naming window to client 304, which is displayed on graphical user interface 324. The application event-naming window is utilized for naming and identifying the specific application event to be monitored by database monitor 318. An example of an application event-naming window is depicted in FIG. 4 and will be discussed further below. Database monitor 318 uses the intelligent algorithm to generate the specific application event monitor.

Subsequent to the application developer submitting the name of the specific application event to server 302, the following command, such as, for example, "db2 delete from schema.tableName" may be issued to clear all previous table entries in database monitor 318. Database monitor 318 monitors the specific application event for any structured query language statement issued during each instance of the specific application event. Additionally, database monitor 318 captures any structured query language statement start time and end time associated with the monitored specific application event. Database monitor 318 writes this captured set of data to a table. The table may reside, for example, in trigger information repository 316.

Before monitoring of the specific application event begins, database management system 308 backs up database 310 to maintain the original state of database 310. Backing up database 310 assists the intelligent algorithm in database comparator 314 to identify state changes between each monitored specific application event and keeps database 310 in a consistent state. As an illustrative example, database management system 308 may issue the following command to backup database 310: "db2 backup DatabaseName to BackupDirectory".

After database 310 is backed up, database management system 308 creates replicate database 312 for the purpose of capturing "before event" data status for database 310. Replicate database 312 is used to store different "snapshots" of database 310 so that a constant comparison of replicate database 312 and database 310 may be made by database comparator 314. Database comparator 314 determines which tables, columns, and values are changed between replicate database 312 and database 310 during each monitored specific application event.

Figure 5:
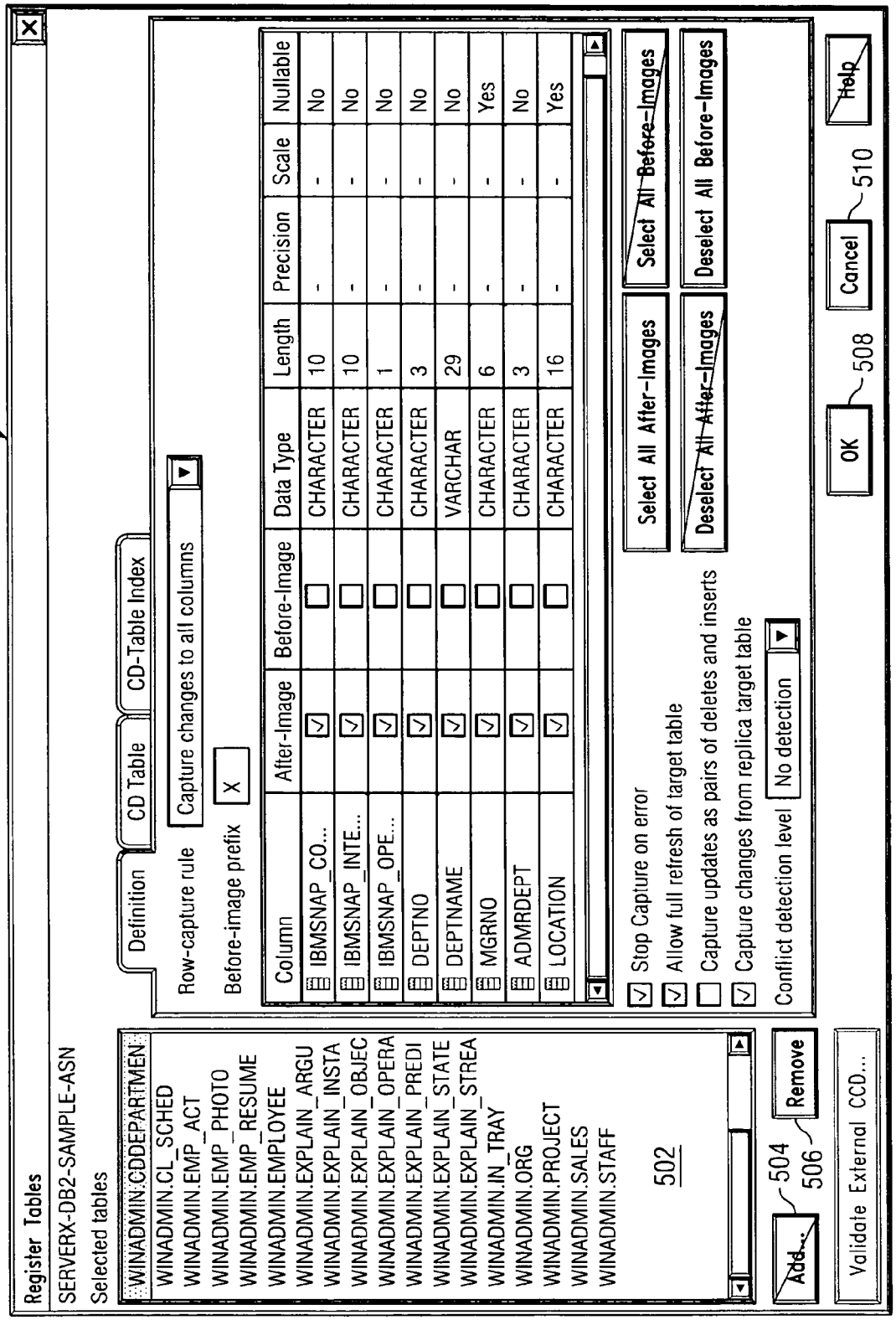
FIG. 5 is a pictorial illustration of an exemplary window for selecting database tables for replication in accordance with an embodiment of the present invention.

Several steps are involved in the replication process of database 310. For example, capture control tables must first be created. Second, database 310 must be enabled for replication. Third, a table within database 310 must be registered as a replication source. During this step of registering tables as replication sources, all the source tables may be registered under one database schema. As an example, DB2®, which is a product available from IBM®, provides a replicate center that allows an end user to specify all tables under a specific schema to be replicated. FIG. 5 shows an example of a table registering window that may be utilized by embodiments of the present invention and will be discussed further below.

Fourth, apply controls tables are created. Finally, a subscription set and a subscription set member are created as necessary for retrieval of data from database 310 for replication. However, it should be appreciated by those of ordinary skill in the art that a script file may automate the exemplary steps above.

To capture the data status of replicate database 312 before the specified application event occurs, database management system 308 may issue the following command "db2 select * from tableName>tableNameBefore." To capture the data status of database 310 after the specified application event occurs, database management system 308 may issue the following command "db2 select * from tableName>tableNameAfter." Then, database management system 308 invokes database comparator 314 to compare tableNameBefore with tableNameAfter to identify the columns and values that changed state within each affected table after the specific application event occurs.

To accomplish this comparison task, database comparator 314 reads the first line in the tableNameBefore file and constructs a java object to represent the table. Then, database comparator 314 reads each entry, constructs an instance of the object, and puts the object in the before pool. In addition, database comparator 314 reads the first line in the tableNameAfter file and constructs a java object to represent the table. Then, database comparator 314 reads each entry, constructs an instance of the object, and puts the object in the after pool.

Subsequently, database comparator 314 compares each object in the before pool with each object in the after pool. By comparing the before pool with the after pool, database comparator 314 is able to identify which column and value was changed in database 310 as a result of the specified application event.

Three possible scenarios may be created by the specific application event. First, the number of objects within the before and after pools remains the same. In this case, only a specific column value is changed or updated as a result of the specific application event. Second, a new entry is added or inserted in the after pool that was not present in the before pool. Third, an entry appears in the before pool, but is removed or deleted from the after pool. These specific application event changes of updating, inserting, and deleting are recorded in trigger information repository 316.

Database analyzer 320 analyzes the table entries recorded in trigger information repository 316 to determine the best candidate for trigger creation. In a case where only one application event occurs on only one table, no ambiguity exists as to which event or table is to be set for a trigger. FIG. 6A below depicts an illustration of this type of scenario. In another case, one application event may involve multiple structured query language statements that affect only one table. In this particular case, database analyzer 320 needs to decide which structured query language statement is the best candidate for a trigger. For example, an insert application event actually changes the state of the table, whereas, an update application event does not. Thus, database analyzer 320 selects the insert application event as the best candidate for the target trigger and not the update application event. FIG. 6B below depicts an illustration of this type of scenario.

In yet another case, a specific application event may involve multiple structured query language statements that affect multiple tables. Database analyzer 320 analyzes the structured query language statements associated with the specific application event to determine if a trigger definition exists within any of the statements. If a trigger is defined within a structured query language statement, then the table affected by the trigger definition is deleted from the candidate list. For example, the trigger statement

```
CREATE TRIGGER RECORD_UPDATE
    AFTER UPDATE OF addressid ON CUSTOMERS
    REFERENCING NEW AS NEWQUOTE
    FOR EACH ROW
    BEGIN ATOMIC
        INSERT INTO ADDRESSBOOK
            VALUES (NEWQUOTE.CITY,
    NEWQUOTE.POSTALCODE, CURRENT TIMESTAMP);
    End
``` indicates that the table CUSTOMERS is the parent and the table ADDRESSBOOK is the child. In this example, after the parent table CUSTOMERS is updated with addressid, an insert event is triggered in the child table ADDRESSBOOK. Consequently, the parent table CUSTOMERS is the best candidate for creation of a trigger because child table ADDRESSBOOK is already acted upon by a trigger.

Server 302 sends statistical analysis of the collected data within trigger information repository 316 and target trigger recommendations and user defined function stubs created by database analyzer 320 to client 304, which requested monitoring of the specific application event. The statistical analysis may include information, such as, for example, how many tables, columns, and values are affected or "touched" by each monitored specific application event, the average number of tables affected by a specific application event, the table most frequently affected by each monitored specific application event, and the like. An application developer using client 304 reviews the statistical analysis, target trigger recommendations, and user defined function stubs to create database triggers to increase the functionality of application 326.

Also, in addition to the statistical analysis and target trigger recommendations, server 302 may send additional information to client 304, such as, for example, the identification of all other possible tables associated with the affected tables based on foreign key relationship. From the affected tables, the intelligent algorithm of database analyzer 320 traverses and builds up the associated tables by querying the system catalog to identify the candidates. This foreign key information may help an enterprise to understand which set of other associated tables may be joined together. Then, the enterprise may send this meaningful information to other enterprise systems to normalize database schema used in most of the applications.

With reference now to FIG. 4, a diagram illustrating an exemplary window for identifying the specific application event to be monitored is shown in accordance with an embodiment of the present invention. An application developer uses database monitoring window 400 to identify the name of the specific application event that the application developer wants to be monitored. An application that resides in a client device, such as application 326 in client 304 in FIG. 3, performs the specific application event within the application's associated database, such as database 310 in FIG. 3.

The application developer receives database monitoring window 400 within a graphical user interface, such as graphical user interface 324 in FIG. 3, in the client device from a server, such as server 302 in FIG. 3, in response to a request for monitoring of the specific application event. The application developer inputs the name of the specific application event in text box 402 by using a user input device, such as a keyboard. However, embodiments of the present invention are not limited to the use of a text box to input the name of the specific application event to be monitored. For example, a drop-down menu listing application events may be utilized.

Subsequent to inputting the name of the specific application event to be monitored within text box 402, the application developer selects submit button 404 or cancel button 406 by using, for example, a mouse. If the application developer "clicks on" submit button 404, then database monitoring window 400 is sent back to the server identifying the specific application event to be monitored and analyzed by aspects of the present invention, such as, for example, database comparator 314, database monitor 318, and database analyzer 320 of FIG. 3. Once the server receives database monitoring window 400 that identifies the specific application event to be monitored and analyzed, aspects of the present invention automatically identify which database tables are associated with the specific application event and the columns and values that are affected. The application developer selects cancel button 406 if the application developer desires not to submit the name of the specific application event for monitoring.

Referring now to FIG. 5, a pictorial illustration of an exemplary window for selecting database tables for replication is depicted in accordance with an embodiment of the present invention. An application developer uses table registration window 500 to select which tables within the database, such as database 310 in FIG. 3, are to be replicated and placed within a replicate database, such as replicate database 312 in FIG. 3. Table registration window 500 may include, for example, a list of all tables under the database schema, such as list of selected tables 502. The application developer may use add button 504 and remove button 506 to selectively add or remove tables from the list of tables within selected tables 502. Then, the application developer may either select OK button 508 to submit table registration window 500 to the database management system, such as database management system 308 in FIG. 3, for table replication or cancel button 510 to cancel table registration window 500.

Turning now to FIGS. 6A & 6B, exemplary tables stored in a trigger information repository are depicted in accordance with an embodiment of the present invention. FIG. 6A is an example of a table stored in the trigger information repository, such as trigger information repository 316 in FIG. 3, which contains data regarding one specific application event with one structured query language statement that affects only one database table. Table 600 may include, for example, event 602, SQL 604, table name 606, execution order 608, column name 610, value change 612, recommended trigger target 614, and recommended trigger priority 616. However, table 600 is only meant for illustration purposes and is not intended as a limitation to embodiments of the present invention. Table 600 may be modified to include more or less information that is deemed necessary by application developers utilizing embodiments of the present invention.

Event 602 contains the name of the monitored specific application event, which is submitted by the application developer in a database monitoring window text box, such as, for example, text box 402 of database monitoring window 400 in FIG. 4. SQL 604 is the structured query language statement type that is associated with event 602. In this particular example, the structured query language statement type is an update statement, as opposed to an insert or delete statement. Table name 606 is the name of the table affected by event 602. Execution order 608 is the order of execution of the structured query language statements. Since only one structured query language statement is executed, that structured query language statement is executed first.

Column name 610 is the name of the specific column affected within table name 606 by event 602. Value change 612 is the specific value changed within column name 610. Recommended trigger target 614 is a recommendation as to whether event 602 is a candidate for a database trigger. In this particular example, event 602 is recommended as a target trigger.

Recommended trigger priority 616 is the priority rating recommendation for a trigger for event 602. In this particular example, the recommended trigger priority is a 1, which is the highest trigger priority rating. Trigger priority recommendations are sent to a client device, such as, for example, client 304 in FIG. 3, in descending trigger recommendation priority order. In other words, specific application events are listed in a table from the highest priority rating for a trigger to the lowest.

A database monitor, such as, for example, database monitor 318 in FIG. 3, provides the data for event 602, SQL 604, and execution order 608. A database comparator, such as, for example, database comparator 314 in FIG. 3, provides the data for table name 606, column name 610, and value change 612. A database analyzer, such as, for example, database analyzer 320 in FIG. 3, provides the analysis and data for recommended trigger target 614 and recommended trigger priority 616.

FIG. 6B is an example of a table stored in the trigger information repository, which contains data regarding one specific application event with multiple structured query language statements that affect only one database table. The column names in table 618 are the same as and represent the same data information as table 600 above. In the example of table 618, the specific application event's name is assign bidder. However, the multiple structured query language statement types are different. SQL 620 is an insert statement, whereas, SQL 622 is an update statement. Both SQL 620 and SQL 622 affect the same table, TBLAUCTSUPPLIERS, but SQL 620 and SQL 622 are not executed at the same time as indicated by execution order 624. SQL 620 is executed first and SQL 622 is executed second.

The database analyzer, after analyzing the data contained within the trigger information repository, determines which structured query language statement is the best candidate for a database trigger. In this particular example, SQL 620 is recommended as a target trigger because SQL 620 insert statement for the specific application event changes the state of the affected table. In addition, the database analyzer gives SQL 620 a recommended priority rating of 1 and creates a user defined function stub for SQL 620.

In contrast, the database analyzer does not recommend SQL 622 update statement for a target trigger because SQL 622 does not change the state of the affected table. Also, the database analyzer gives SQL 622 a priority recommendation of 2. As a result, the database analyzer lists SQL 620 insert statement first in the table with a 1 priority rating and SQL 622 second with a 2 priority rating because the database analyzer produces a table of recommendations in decreasing sequential priority order.

Figure 7:
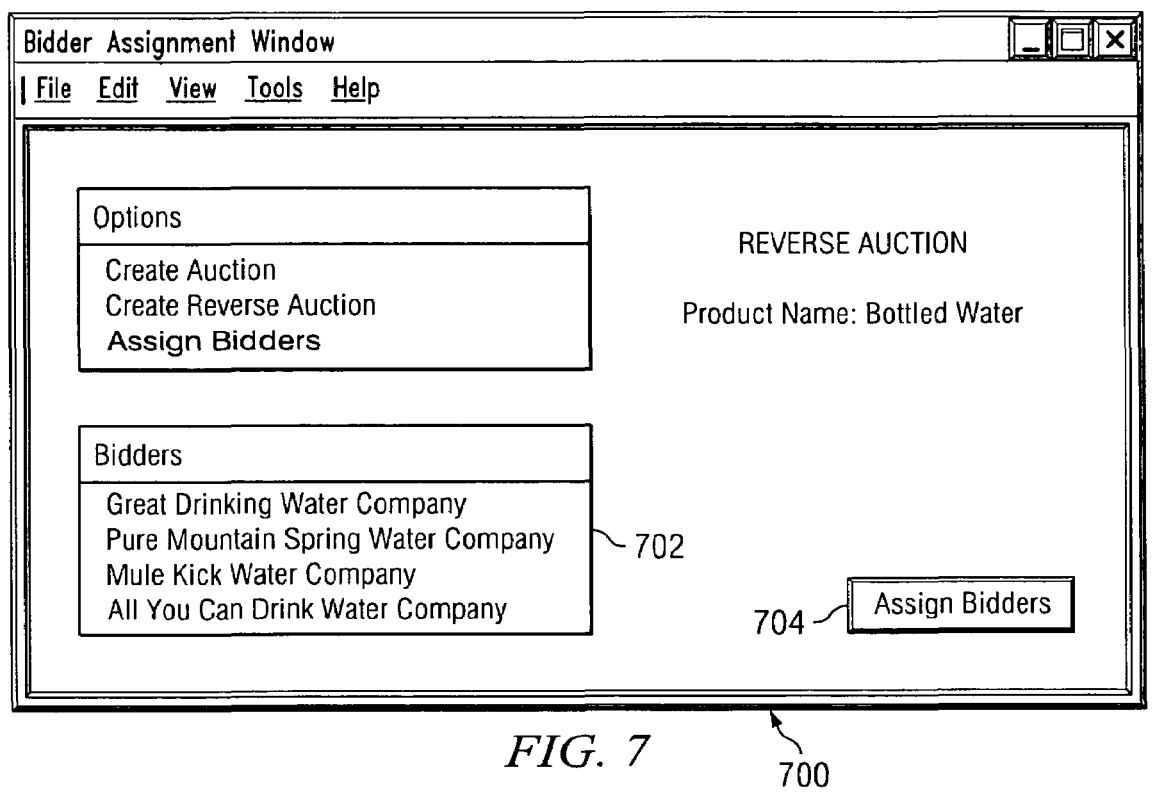
FIG. 7 is a specific illustrative example of identifying database triggers for a software application in accordance with an embodiment of the present invention.

With reference now to FIG. 7, a specific illustrative example of identifying database triggers for a software application is shown in accordance with an embodiment of the present invention. A software application, such as, for example, application 326 in FIG. 3, produces window 700 within a graphical user interface, such as, for example, graphical user interface 324 in FIG. 3, for an end user to interact with the software application. In this specific illustrative example, the software application allows an end user for an enterprise to create and conduct an auction or a reverse auction for products and services. The end user, in this example chooses to create a reverse auction where suppliers bid to provide a product, such as, for example, bottled water, to the enterprise.

After the end user creates the reverse auction for bottled water, the end user assigns bidders, such as bidders 702, to the auction. Subsequently, the end user notifies the assigned bidders that a reverse auction for bottled water has been created. The end user, in addition to creating a reverse auction for bottled water, wants to identify any database triggers that may be needed by the enterprise to modify or enhance the auction software application. By utilizing aspects of the present invention, discussed in FIGS. 3-5 above, the end user is able to identify database triggers for the auction software application. The end user identifies the name of the specific application event to be monitored using a database monitoring window, such as, for example, database monitoring window 400 in FIG. 4. In this particular example, the specific application event is "assign bidders." Consequently, when the user clicks on assign bidders button 704, aspects of the present invention, for example, a database comparator, database monitor, and database analyzer, such as database comparator 314, database monitor 318, and database analyzer 320 in FIG. 3, are used to automatically discover the table(s), column(s), and value(s) affected by the specific application event assign bidders, identify the best candidate for a database trigger, and create a user defined function stub for the identified database trigger.

The database monitor captures the structured query language statements, such as SQL 620 insert statement and SQL 622 update statement in FIG. 6, associated with the specific application event assign bidders, when the end user clicks on assign bidders button 704. For illustration purposes, the structured query language statements for this particular example may resemble the following:

INSERT INTO TBLAUCSUPPLIERS (ID, MINALOC, ADDEDBY, DATEADDED, ACCEPTEDTERMS, MAXALOC, FACTORINDICATOR, USERID, ACCEPTEDTERMSDATE, DOWNLOADEDRFQDATE, DOWNLOADEDRFQ, FACTORVALUE, FACTORPERCENT, AUCTIONHEADERID, SUPPLIERID, STATUSID) VALUES (?, ?, ?, ?, ?,

-continued

```
?, ?, ?, ?, ?, ?, ?, ?, ?, ?, ?)
UPDATE TBLAUCSUPPLIERS   SET MINALOC = ?,
 ADDEDBY = ?, DATEADDED = ?, ACCEPTEDTERMS =
 ?, MAXALOC = ?, FACTORINDICATOR = ?, USERID =
 ?, ACCEPTEDTERMSDATE = ?, DOWNLOADEDRFQDATE =
 ?, DOWNLOADEDRFQ = ?, FACTORVALUE = ?,
 FACTORPERCENT = ?, AUCTIONHEADERID = ?,
 SUPPLIERID = ?, STATUSID = ? WHERE ID = ?
REFRESH TABLE SMAUCSUPPLIERS
```

As a result, the table stored in the trigger information repository, such as trigger information repository 316 in FIG. 3, is the same as table 618 in FIG. 6B.

Figure 8:
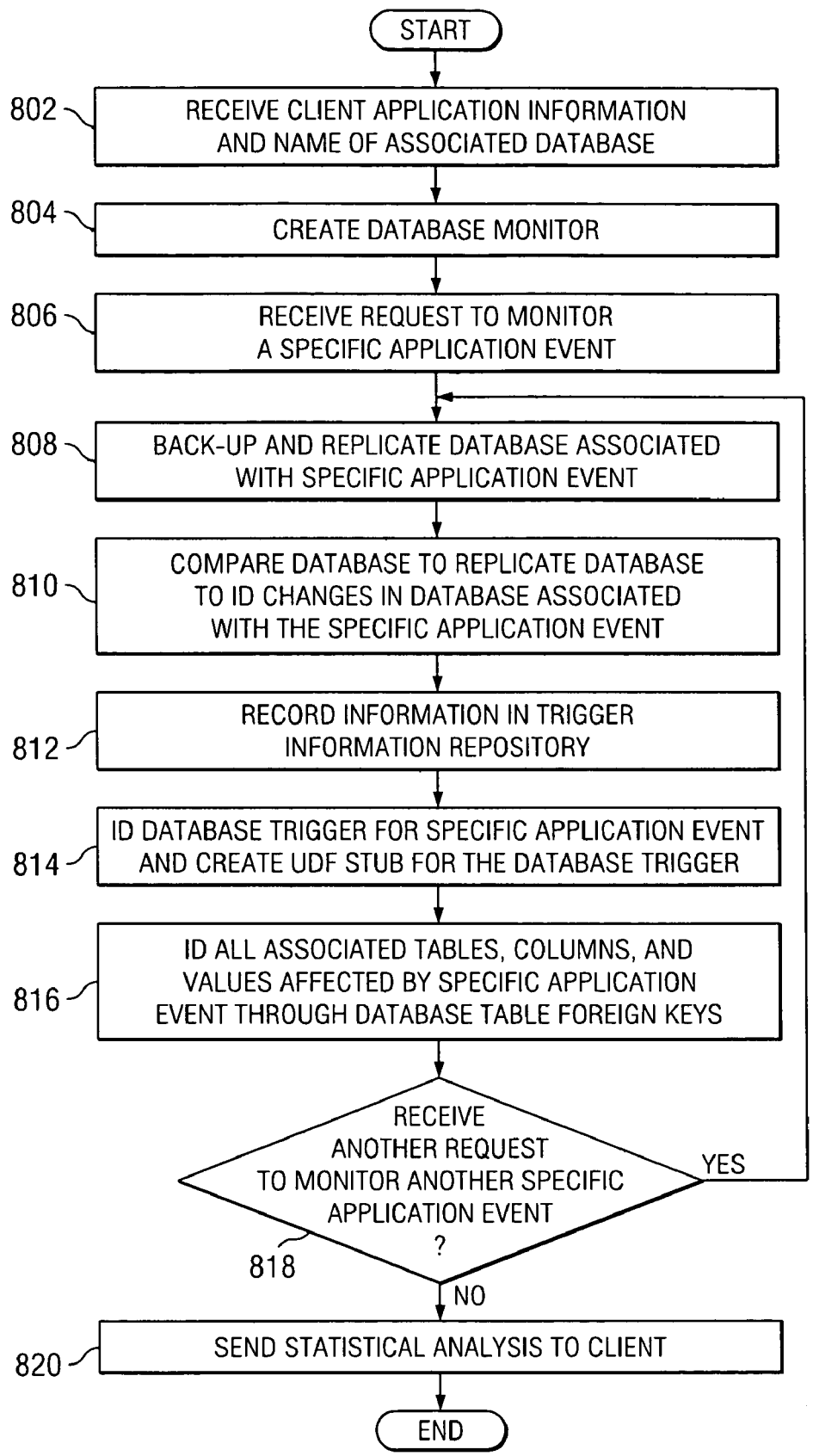
FIG. 8 is a flowchart illustrating an exemplary process for a server to create database triggers in accordance with an embodiment of the present invention.

Referring now to FIG. 8, a flowchart illustrating an exemplary process for a server to identify database triggers is depicted in accordance with an embodiment of the present invention. The process depicted in FIG. 8 may be implemented in a server device, such as, for example, server 302 in FIG. 3.

The process begins when the server receives information regarding a software application that resides in a client device and the software application's related database name. For example, the server receives information regarding application 326 that resides in client 304 and related database 310 in FIG. 3 (step 802). Then the server receives a request from the client device to set-up a database monitor, such as database monitor 318 in FIG. 3, to monitor a specific application event, which is performed by the application that resides in the client device. In response to receiving the request to set-up the database monitor, the server creates the database monitor using an intelligent algorithm, such as, for example, algorithm 1000 in FIG. 10 discussed below (step 804).

After creating the database monitor in step 804, the server receives a request to monitor a specific application event through a window, such as database monitoring window 400 in FIG. 4 (step 806). In response to the request to monitor the specific application event, the database management system, such as database management system 308 in FIG. 3, backs up the database associated with the specific application event and creates a replicate database, such as replicate database 312 in FIG. 3, identical to the database at the time of backup (step 808).

A database comparator, such as database comparator 314 in FIG. 3, compares the database after each occurrence of the specific application event with the replicate database to identify changes in the database associated with the specific application event (step 810). A trigger information repository, such as trigger information repository 316 in FIG. 3, records which tables, columns, and values are changed as a result of the specific application event, along with the name of the specific application event, the structured query language statement type, and the order of execution of the structured query language statements (step 812). A database analyzer, such as database analyzer 320 in FIG. 3, analyzes the data contained within the trigger information repository to determine if a database trigger is recommended for the structured query language statement, such as recommended trigger target 614 in FIG. 6, and assign a trigger priority recommendation rating for each structured query language statement, such as recommended trigger priority 616 in FIG. 6. In addition, the database analyzer creates a user defined function stub for the recommended triggers (step 814). Furthermore, the database analyzer identifies all other associated tables, columns, and values through foreign keys within the affected database table by the specific application event (step 816).

Then, a determination is made as to whether the server receives another request from the client device to monitor another specific application event (step 818). If the server receives another request to monitor another specific application event, yes output of step 818, then the process returns to step 808 where the database management system backs up and replicates the database once more. If the server does not receive another request to monitor another specific application event, no output of step 818, then the server sends trigger recommendations, trigger priority rating recommendations, and user defined function stubs, along with a statistical analysis that includes, for example, the average number of tables affected by the specific application event and the most frequently updated table, to the client device for review by an application developer (step 820). The process terminates thereafter.

Turning now to FIG. 9, a flowchart illustrating an exemplary process for a client to request database monitoring is shown in accordance with an embodiment of the present invention. The process shown in FIG. 9 may be implemented in a client device, such as client 304 in FIG. 3.

The process begins when the client device analyzes the impact of a software application, such as application 326 in FIG. 3, upon an enterprise (step 902). After analyzing the application's impact upon the enterprise in step 902, the client device determines the most significant application event that accelerates the collaboration between the enterprise and the enterprise's partners (step 904). For example, the enterprise may wish to inform its partners, such as auction bidders, that a new auction has been created for product bidding. Subsequent to determining the most significant application event in step 904, the client device sends a request to monitor the specific application event (step 906). Finally, the client device receives statistical analysis, trigger recommendations, and user defined function stubs for the monitored specific application event (step 908). The process terminates thereafter.

With reference now to FIG. 10, an exemplary algorithm for monitoring the specific application event is shown in accordance with an embodiment of the present invention. An application developer locates the monitoring algorithm for monitoring each specific application event within a database monitor, such as database monitor 318 in FIG. 3. Algorithm 1000 is only presented as an example of an algorithm that may be utilized by embodiments of the present invention to monitor specific application events. Embodiments of the present invention are not restricted to the use of algorithm 1000. Any algorithm may be utilized by embodiments of the present invention that is capable of monitoring specific application events.

Thus, embodiments of the present invention provide a computer implemented method, apparatus, and computer usable program code to identify database triggers. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to identify database triggers in a data processing system, the computer implemented method comprising:
   responsive to receiving a request to create a database monitor for a specific application event, creating the database monitor;
   responsive to receiving a request to monitor the specific application event within a database, creating a replicate database of the database;
   monitoring the specific application event;
   comparing the database to the replicate database after the specific application event occurs to identify changes in the database associated with the specific application event;
   recording the identified changes in the database associated with the specific application event;
   identifying a best candidate for a database trigger based upon the identified changes in the database associated with the specific application event;
   listing recommended database triggers for the specific application event in a table in decreasing priority order;
   creating a user defined function stub for the recommended database triggers; and
   sending the listed recommended database triggers and created user defined function stubs, along with a statistical analysis of the recorded identified changes in the database associated with the specific application event.

2. The computer implemented method of claim 1, wherein the steps are implemented in a server device.

3. The computer implemented method of claim 1, wherein the comparing step is performed by a database comparator, and wherein the database comparator invokes an intelligent algorithm to compare the database to the replicate database.

4. The computer implemented method of claim 1, wherein the identified changes in the database associated with the specific application event are changes in a column and a value within an affected table by the specific application event.

5. The computer implemented method of claim 1, wherein the recording step is performed by a trigger information repository.

6. The computer implemented method of claim 1, wherein the listing and creating steps are performed by a database analyzer, and wherein the database analyzer invokes an intelligent algorithm to list the recommended database triggers and create the user defined function stubs.

7. The computer implemented method of claim 1, wherein the monitoring step is performed by the database monitor, and wherein the database monitor invokes an intelligent algorithm to monitor the specific application event.

8. The computer implemented method of claim 1, wherein the specific application event is at least one of an insert, delete, or update structured query language statement.

9. The computer implemented method of claim 1, further comprising:
   identifying all foreign keys in affected tables by the specific application event, wherein the foreign keys identify all other tables associated with the specific application event.

10. The computer implemented method of claim 9, wherein the identified all other tables are used to identify other trigger candidates.

* * * * *